United States Patent [19]

Kranz

[11] Patent Number: 4,979,697
[45] Date of Patent: Dec. 25, 1990

[54] CONTROL PROPULSION UNIT, ESPECIALLY FOR EXERTING TRANSVERSE FORCES ON A MISSILE

[75] Inventor: Walter Kranz, Taufkrichen, Fed. Rep. of Germany

[73] Assignee: Messerschmitt-Bölkow-Blohm GmbH, Munich, Fed. Rep. of Germany

[21] Appl. No.: 429,411

[22] Filed: Oct. 31, 1989

[30] Foreign Application Priority Data

Dec. 24, 1988 [DE] Fed. Rep. of Germany ....... 3843804

[51] Int. Cl.⁵ .............................................. F41G 7/00
[52] U.S. Cl. ..................................................... 244/3.22
[58] Field of Search .................. 244/3.22; 239/265.19, 239/265.15

[56] References Cited

U.S. PATENT DOCUMENTS

| 3,447,465 | 6/1967 | White | 102/378 |
| 4,573,648 | 3/1986 | Morenus et al. | 244/3.22 |
| 4,765,565 | 8/1988 | Buchele-Buecher et al. | 244/3.22 |
| 4,826,104 | 5/1989 | Bennett et al. | 244/3.22 |

Primary Examiner—Charles T. Jordan
Assistant Examiner—Rochelle Lieberman
Attorney, Agent, or Firm—Kenyon & Kenyon

[57] ABSTRACT

A control propulsion unit with a solid propellant (4) and a discharge nozzle, through which the propellant gases emerge into the open air, especially to exert transverse forces on a missile. To be able to precisely, quantitatively regulate the transverse forces, in accordance with the invention, it is proposed to extinguish the propellant in a controlled operation by reducing the clamping of the control propulsion unit, for example, by enlarging the discharge port for the propellant gases.

6 Claims, 2 Drawing Sheets

CONTROL PROPULSION UNIT, ESPECIALLY FOR EXERTING TRANSVERSE FORCES ON A MISSILE

BACKGROUND OF THE INVENTION

The present invention relates to a control propulsion unit.

To improve the steering and control response of a missile, for example of a small-caliber missile in the form of a grenade, so-called miniature control propulsion units are often used to generate transverse forces on the missile. These control propulsion units usually have a solid propellant, which can be ignited in a controlled operation, whereby the propellant gases emerge through a small discharge nozzle into the open air. After ignition, the solid propellant burns off completely. Altogether, the transverse force generated on the missile is determined by the amount of total propellant; compare EP-Al No. 28 966.

It is also a known procedure to arrange such miniature control propulsion units in a rotary nozzle housing, which then can be forced into different positions by means of destructible restraining lines; compare German Patent No. 34 42 975. Hereby, one can precisely regulate the length of time that the transverse force acts on the missile. However, this is not possible in the case of the above-mentioned miniature control propulsion units.

SUMMARY OF THE INVENTION

An object of the present invention is to provide a control propulsion unit of the type discussed having a simple design, which will enable the thrust of the propulsion unit and especially the active duration of the transverse force to be precisely adjusted.

The above and other objects of the invention are achieved by a control propulsion unit having a solid propellant and a discharge nozzle, whereby the propellant gases emerge through the discharge nozzle in the open air, especially to exert transverse forces on a missile, wherein the control propulsion unit includes means which can be controlled after the solid propellant is ignited, for reducing the clamping of the control propulsion unit, said means for reducing the clamping comprising means for reducing the ratio between the combustion surface of the propellant and the narrowest cross-section of the discharge nozzle to such an extent that the propellant extinguishes automatically.

Accordingly, the invention takes a path, which differs from the previous solutions. In accordance with the invention, the propellant is extinguished by noticeably reducing the clamping of the control propulsion unit. The clamping of a control propulsion unit is understood to be the ratio between the combustion surface of the propellant and the narrowest cross-section of the discharge nozzle. If the clamping is reduced five times, for example, it turns out that the propellant is automatically extinguished within 1 to 2 milliseconds. In this case, the discharge nozzle originally had a smallest diameter of 1.5 mm, and the diameter of the combustion surface of the propellant amounted to approximately 25 mm. The propellant is suddenly automatically extinguished, when the diameter of the outlet is enlarged to 3 to 3.5 mm.

This clamping reduction can be achieved, for example, with a design whereby the discharge nozzle is situated in a piston, which is guided in the missile and is expelled by the propellant gases, for example, after a clamping ring is loosened. It is equally possible to provide additional blowout ports, which at first are closed and then are opened in a controlled operation. These blow-out ports can be closed, for example, with a glass material, which is kept under tension and which withstands the internal pressure of the control propulsion unit A fuse wire is inserted in this glass material, and a current is conducted through this wire to destroy the glass material. The glass is then likewise expelled by the propellant gases.

Further refinements of the invention will be apparent from the following description.

BRIEF DESCRIPTION OF THE DRAWINGS

The invention will be described in greater detail in the following detailed description with reference to the drawings, in which.

DETAILED DESCRIPTION

Figure 1:
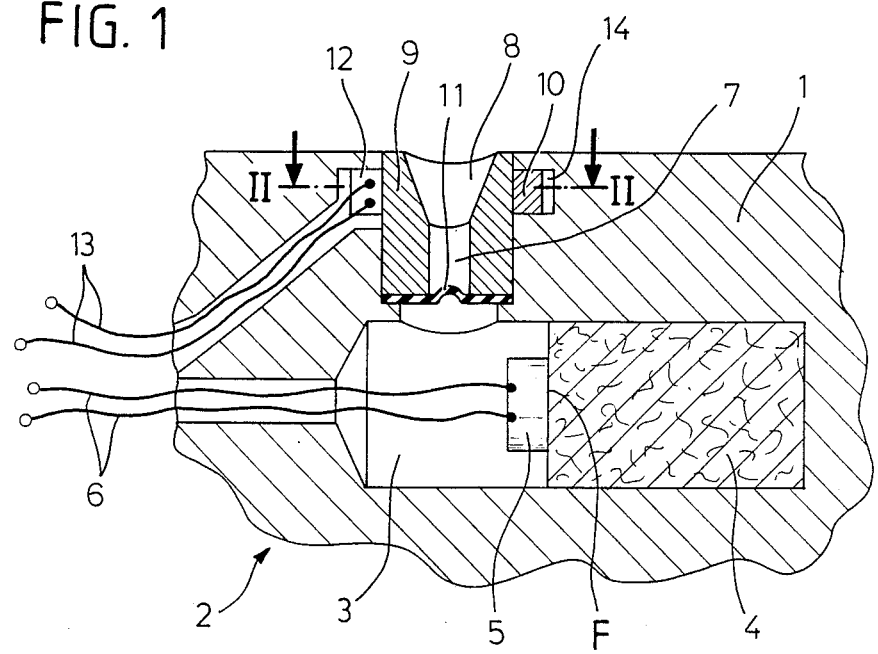
FIG. 1 shows a longitudinal section through a section of the missile with a control propulsion unit according to the invention.
Figure 2:
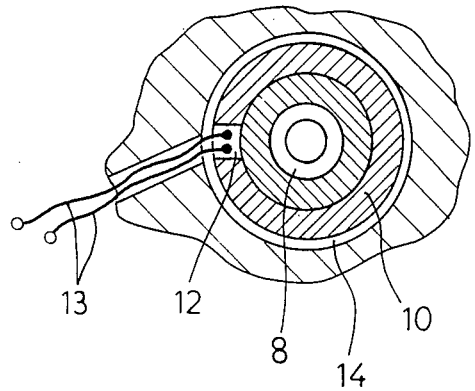
FIG. 2 shows a section along II/II in FIG. 1.

FIG. 1 depicts a section of a missile 1, in which a control propulsion unit 2 is situated parallel to its longitudinal axis, near its periphery. This control propulsion unit has a take-up cylinder 3, aligned parallel to the longitudinal direction of the missile, for a solid propellant 4. The solid propellant easily fills up half of the take-up cylinder 3 and can be electrically ignited with the help of an igniter cap 5 through two connection wires 6. A narrow duct 7 branches off from the take-up cylinder 3 toward the periphery of the missile and empties into a discharge nozzle 8. The duct and the discharge nozzle are situated in a cylindrical piston 9, which is retained in the missile with the help of a clamping ring 10. The bottom side of the piston 9 is closed by a membrane 11, which is turned toward the section of the take-up cylinder, which is not filled with propellant 4. A section of the circumference of the clamping ring 10 is formed by a small pyrotechnic charge 12, which can be ignited electrically through connection wires 13. As proceeds form FIGS. 1 and 2, the clamping ring is situated in a circular groove 14, which surrounds the piston 9 and has an inner diameter which is larger than the outer diameter of the clamping ring 10.

If a transverse force is to be exerted on a missile flying toward a target, the solid propellant 4 is ignited electrically by way of the igniter cap 5, in order to steer this missile to the target. The propellant 4 burns off over its entire surface F, whereby a high pressure builds up in the take up cylinder 3. After a short time, this pressure causes the membrane 11 to burst. The propellant gases then stream through the duct 7 and the discharge nozzle to the outside, by which means the desired transverse force is exerted on the thrust body.

The burning of the propellant itself and the thrust are given inter alia by the clamping, that is the ratio between the combustion surface F of the propellant and the cross-sectional area of the duct 7.

If the transverse force needs to be stopped, then the pyrotechnic charge 12 is ignited electrically through the connection wires 13, whereby the clamping ring 10 is enlarged and the piston 9 is released. By this means, the propellant gases of the control propulsion unit 2 act approximately on the entire bottom ring surface of the piston 9, so that this piston is expelled suddenly out of the missile. The propellant gases can then stream to the outside through the resulting large opening. By this means, the above-defined clamping is drastically reduced at the same time, however, so that the solid propellant 4 is extinguished almost abruptly.

Figure 3:
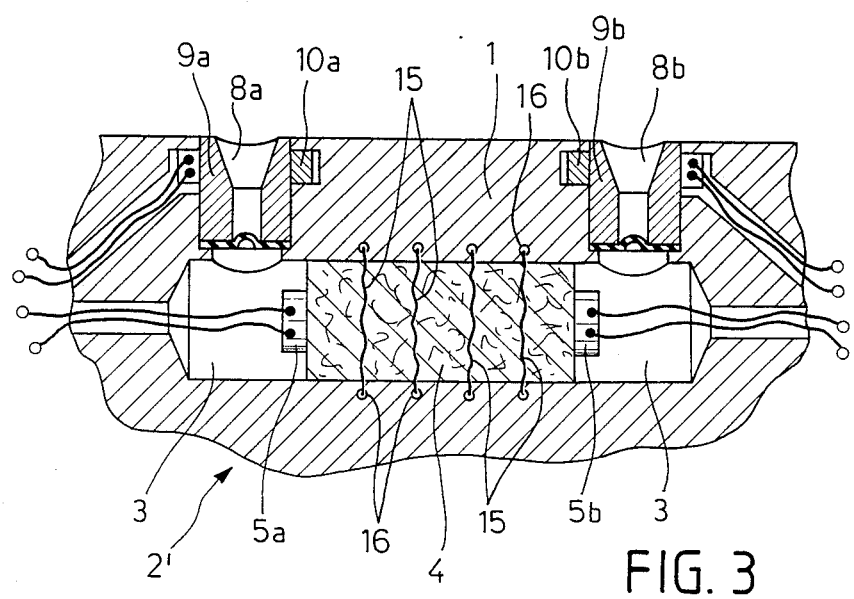
FIG. 3 shows a longitudinal section through a section of a missile with a control propulsion unit, according to the invention, in a double arrangement.

A modified control propulsion unit 2' is depicted in FIG. 3. It consists of two control propulsion units, in accordance with FIG. 1, which are coupled to each other, whereby, however, the solid propellant 4 for both control propulsion units is arranged in a shared take-up cylinder 3. Two discharge nozzles 8a and 8b are provided on both sides of the receiving cylinder 3 and each is situated in a piston 9a or 9b. They are retained in the missile 1, in the same way as in the exemplified embodiment of FIG. 1, by a clamping ring 10a or 10b. The solid propellant 4 can be ignited on both sides by way of an igniter cap 5a or 5b. Inside the solid propellant 4, fuse wires 15, which still traverse the propellant, are spaced apart and are connected over connections 16 with a control switching operation not shown here. As soon as the burning of the propellant reaches one of the fuse wires 15, these wires are disconnected, so the control switching operation receives a signal, which gives evidence of the combustion already attained. In accordance with this signal, as described above, the propellant can then be extinguished. When the fuse wires are disconnected, this also signals how much propellant is still available for the second ignition.

With this specific embodiment, the thrust generating the transverse force on the missile can be adjusted with even greater sensitivity and propellant can be economized.

Figure 4:
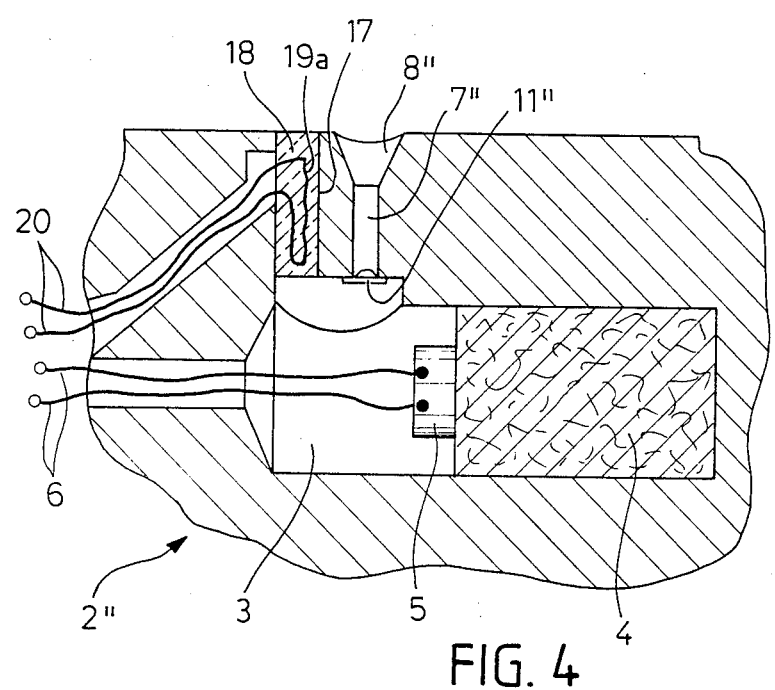
FIG. 4 shows a longitudinal section through a section of a missile with a modified specific embodiment of a control propulsion unit, according to the invention.

In FIG. 4, a control propulsion unit 2" is represented with a configuration of the take-up cylinder 3 and of the propellant 4 corresponding to that of FIG. 1. A duct 7", which is closed with a membrane 11", branches off from the section of the take-up cylinder 3, which is not filled with the propellant 4, and empties in turn into the discharge nozzle 8". Parallel to the duct 7", a borehole 17, which communicates with the take-up cylinder 3 and is filled with a glass material 18, leads to the outside. A fuse wire 19 is inserted into this glass material 18 and a current can be conducted through this fuse wire by way of connection wires 20.

If the propellant 4 is ignited electrically by means of the igniter cap 5 through the connection wires 6, the membrane 11' bursts after a short time, so that the propellant gases are conveyed through the discharge nozzle 8" to the outside, and the desired transverse force is exerted on the missile. In this case, the glass material is so firm, that it is not destroyed by the propellant gases.

If the transverse force needs to be stopped, then a current is conducted through the fuse wire 19, so that voltage builds up in the glass material 18 causing it to burst. The fragments are expelled suddenly into the open air, so that, in turn, the clamping of the control propulsion unit is reduced and the propellant is likewise extinguished almost abruptly.

There are many possible variations for refinements of control propulsion units, to extinguish the propellant by means of a clamping reduction. This can also be achieved, for example, when control propulsion units are arranged radially in the missile, whereby, for instance, the connection between the take-up cylinder for the propellant and the discharge nozzle is then severed. In the same way, the combustion surfaces of the propellant can be shaped differently to attain larger combustion surfaces, for example. It is possible to combine several control propulsion units with one shared propellant, however, in this case, after igniting the individual control propulsion units, it is important that the remaining propellant parts remain pressure-tight relative to the other combustion chambers.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A control propulsion unit having a solid propellant and a discharge nozzle, whereby propellant gases from ignition of said solid propellant emerge through said discharge nozzle into the open air, to exert forces on a missile, the discharge nozzle having a cross section which has a point of wider cross section and a point of narrowest cross section, the control propulsion unit comprising means, which can be controlled after the solid propellant is ignited, for reducing clamping of the control propulsion unit, said means for reducing clamping comprising means for reducing the ratio between a combustion surface of the propellant and the narrowest cross section of the discharge nozzle to such an extent that the propellant extinguishes automatically.

2. The control propulsion unit recited in claim 1, wherein the discharge nozzle is disposed in a piston, the propellant gases acting on said piston, and said means for reducing clamping comprises a releasable holding device, the piston being retained by said holding device, said holding device being releasable whereby upon releasing the holding device, said piston is expelled out of the missile by the propellant gases thereby reducing clamping by enlarging the discharge nozzle opening and reducing said ratio.

3. The control propulsion unit recited in claim 2, wherein the holding device is a clamping ring, which can be expanded by means of a pyrotechnic charge.

4. The control propulsion unit recited in claim 1, further comprising a borehole disposed adjacent the discharge nozzle which leads to the open air, the borehole being closed with a material which can be destroyed in a controlled operation.

5. The control propulsion unit recited in claim 4, wherein the borehole is closed with a glass material, into which a fuse wire is inserted.

6. The control propulsion unit recited in claim 2, wherein the releasable holding device comprises one of an expandable and destructible holding device.

* * * * *